(12) United States Patent
Kalazny

(10) Patent No.: US 6,189,930 B1
(45) Date of Patent: Feb. 20, 2001

(54) JOINT BETWEEN SIDE RAIL AND CROSS MEMBER IN A VEHICLE FRAME ASSEMBLY

(75) Inventor: Andrzej J. Kalazny, Pukackie (PL)

(73) Assignee: Dana Corporation, Toledo, OH (US)

( * ) Notice: Under 35 U.S.C. 154(b), the term of this patent shall be extended for 0 days.

(21) Appl. No.: 09/368,024

(22) Filed: Aug. 3, 1999

(51) Int. Cl.⁷ .................................................... B60J 7/00
(52) U.S. Cl. .................. 280/781; 280/800; 280/795; 296/264
(58) Field of Search ................. 296/204; 280/781, 280/800, 795

(56) References Cited

U.S. PATENT DOCUMENTS

| | | |
|---|---|---|
| 2,356,309 | 8/1944 | Garbe . |
| 2,431,524 | 11/1947 | Ulrich et al. . |
| 2,508,032 | 5/1950 | Kennedy . |
| 3,234,704 | 2/1966 | Burgess et al. . |
| 3,332,197 | 7/1967 | Hinkle . |
| 3,611,666 | 10/1971 | Poyser et al. . |
| 4,069,638 | 1/1978 | Hasselqvist et al. . |
| 4,226,465 * | 10/1980 | McCullough ....................... 296/204 |
| 4,289,214 * | 9/1981 | Spence ................................. 280/781 |
| 4,691,494 | 9/1987 | Gwynne . |
| 4,712,942 | 12/1987 | Brown . |
| 4,760,682 | 8/1988 | King . |
| 4,848,835 * | 7/1989 | DRees ................................. 296/204 |
| 4,958,844 * | 9/1990 | Hancock ............................. 296/204 |
| 5,188,418 * | 2/1993 | Walworth, Jr. et al. ............ 296/204 |
| 5,205,587 * | 4/1993 | Orr ..................................... 296/204 |
| 5,209,541 | 5/1993 | Janotik . |
| 5,327,989 * | 7/1994 | Furuhashi et al. .................. 296/204 |
| 5,464,302 | 11/1995 | Menchetti . |
| 5,480,189 * | 1/1996 | Davies et al. ...................... 280/800 |
| 5,562,329 * | 10/1996 | Srock et al. ........................ 296/204 |
| 5,938,272 * | 8/1999 | Jurica et al. ....................... 296/204 |
| 6,092,862 * | 7/2000 | Kuwahara .......................... 296/204 |

* cited by examiner

Primary Examiner—Joseph D. Pape
Assistant Examiner—Kiran Patel
(74) Attorney, Agent, or Firm—MacMillan, Sobanski & Todd, LLC

(57) ABSTRACT

A joint between a side rail and a cross member in a vehicle body and frame assembly provides for direct positive positioning of the side rails relative to the ends of the cross members to expedite the manufacturing process. The side rail is generally C-shaped in cross section, including a generally vertically extending web portion having upper and lower flange portions extending therefrom. The upper flange portion is formed having a longitudinally extending, generally U-shaped recess, while the lower flange portion is formed having a longitudinally, extending generally inverted U-shaped recess. The cross member includes an upper cross member having an end portion composed of a flange portion that terminates in a generally U-shaped protrusion. The flange portion of the upper cross member extends across the upper surface of the upper flange portion of the side rail, while the U-shaped protrusion is received in the U-shaped recess. The cross member further includes a lower cross member having an end portion composed of a flange portion that terminates in a longitudinally extending, generally inverted U-shaped protrusion. The flange portion of the lower cross member extends across the upper surface of the lower flange portion of the side rail, while the inverted U-shaped protrusion is received in the U-shaped recess. The side rail and the cross member are positively positioned relative to one another and can be formed using conventional roll forming techniques. If desired, a reinforcement member may be provided at the joint between either or both of the upper and lower cross members with the side rail.

10 Claims, 5 Drawing Sheets

JOINT BETWEEN SIDE RAIL AND CROSS MEMBER IN A VEHICLE FRAME ASSEMBLY

BACKGROUND OF THE INVENTION

This invention relates in general to body and frame assemblies for vehicles. More specifically, this invention relates to an improved structure for a joint between a side rail and a cross member in such a vehicular body and frame assembly.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modern vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. In ladder frame assemblies intended for relatively heavy duty use, it is known that some or all of the cross members may be provided in pairs, wherein an upper cross member extends between the upper portions of the side rails and a lower cross member extends between the lower portions of the side rails.

In a typical process for forming the ladder frame assembly, the ends of the cross members (either individually or in pairs, as mentioned above) are usually initially positioned on a mounting fixture. Next, the side rails are positioned on the mounting fixture adjacent to the ends of the cross members. The side rails and the ends of the cross members are then secured together, such as by welding. However, this process has been found to be relatively difficult and time consuming to perform. This is because there is usually no structure provided on either the side rail or the cross member that provides for direct positive positioning of the side rails relative to the ends of the cross members. Although portions of the side rails and the ends of the cross members do abut one another, they can undesirably be moved or oriented in one or more directions relative to one another. Precise relative positioning of the side rails and cross members is a very important factor in the manufacture of a satisfactory ladder frame assembly. As a result, an undue amount of time is often spent to insure that the side rails and the cross members are properly aligned relative to one another prior to effecting the welding operation. Thus, it would be desirably to provide an improved structure for a joint between a side rail and a cross member in a vehicle body and frame assembly that provides for direct positive positioning of the side rails relative to the ends of the cross members to expedite the manufacturing process.

SUMMARY OF THE INVENTION

This invention relates to an improved structure for a joint between a side rail and a cross member in a vehicle body and frame assembly that provides for direct positive positioning of the side rails relative to the ends of the cross members to expedite the manufacturing process. The side rail is generally C-shaped in cross section, including a generally vertically extending web portion having upper and lower flange portions extending therefrom. The upper flange portion is formed having a longitudinally extending, generally U-shaped recess, while the lower flange portion is formed having a longitudinally, extending generally inverted U-shaped recess. The cross member includes an upper cross member having an end portion composed of a flange portion that terminates in a generally U-shaped protrusion. The flange portion of the upper cross member extends across the upper surface of the upper flange portion of the side rail, while the U-shaped protrusion is received in the U-shaped recess. The cross member further includes a lower cross member having an end portion composed of a flange portion that terminates in a longitudinally extending, generally inverted U-shaped protrusion. The flange portion of the lower cross member extends across the upper surface of the lower flange portion of the side rail, while the inverted U-shaped protrusion is received in the U-shaped recess. The side rail and the cross member are positively positioned relative to one another and can be formed using conventional roll forming techniques. If desired, a reinforcement member may be provided at the joint between either or both of the upper and lower cross members with the side rail.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
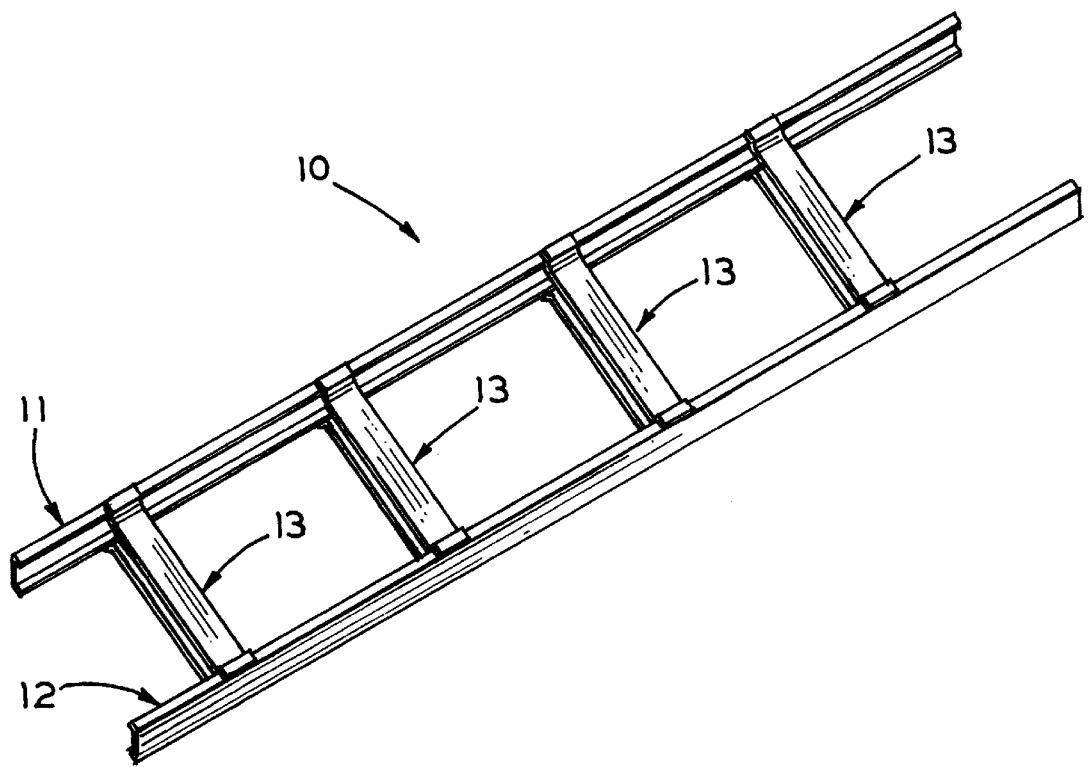
FIG. 1 is a perspective view of a known structure for a vehicle body and frame assembly including a pair of side rails having a plurality of upper cross members extending therebetween.

Referring now to the drawings, there is illustrated in FIG. 1, a vehicle body and frame assembly, indicated generally at 10, that is generally conventional in the art. The illustrated vehicle frame assembly 10 is a ladder frame assembly including a pair of longitudinally extending side rails, indicated generally at 11 and 12, having a plurality of transverse cross members, indicated generally at 13, extending therebetween. The side rails 11 and 12 extend longitudinally throughout the entire length of the assembly 10 and are generally parallel to one another. Each of the side rails 11 and 12 in the illustrated embodiment is formed from a single open channel structural member, i.e., a structural member having a non-continuous cross sectional shape (U-shaped or C-shaped channel members, for example). However, it will be appreciated that one or both of the side rails 11 and 12 may be formed from a plurality of individually formed open channel structural members that are secured together by any conventional means, such as by welding, riveting, bolting, and the like. The cross members 13 extend generally perpendicular to the side rails 11 and 12. The illustrated cross members 13 are identical in structure, although such is not necessary. The cross members 13 are spaced apart from one another along the length of the ladder frame assembly 10 and are secured to the side rails 11 and 12 in a manner at respective joints, the structures of which are described in detail below. When secured to the side rails 11 and 12, the cross members 13 through 17 provide lateral and torsional rigidity to the ladder frame assembly 10.

Figure 2:
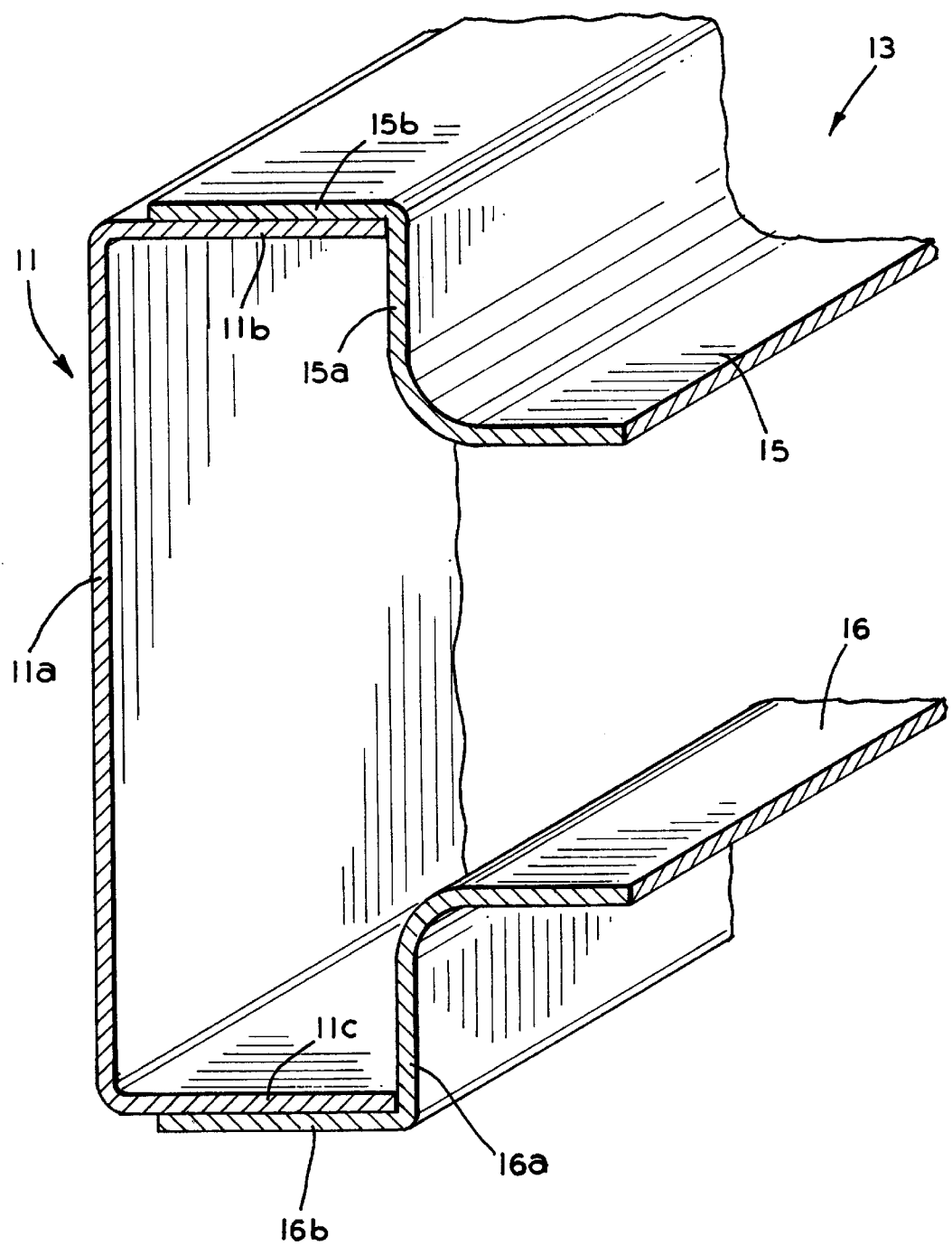
FIG. 2 is an enlarged sectional perspective view illustrating a known structure for a joint between one of the side rails and the end of one of the cross members illustrated in FIG. 1.

The structure of the joint between the side rail 11 and the end portion of one of the cross members 13 is illustrated in greater detail in FIG. 2. As shown therein, the side rail 11 is generally C-shaped in cross section, including a generally vertically extending web portion 11a having upper and lower flange portions 11b and 11c extending generally horizontally inwardly therefrom. The cross member 13 includes an upper cross member 15 having an end portion composed of a generally vertically extending web portion 15a and a generally horizontally outwardly extending flange portion 15b. The web portion 15a of the upper cross member 15 abuts the innermost end of the upper flange portion 11b of the side rail 11, while the flange portion 15b of the upper cross member 15 extends across the upper surface of the upper flange portion 11b of the side rail 11. The cross member 13 further includes a lower cross member 16 having an end portion composed of a generally vertically extending web portion 16a and a generally horizontally outwardly extending flange portion 16b. The web portion 16a of the lower cross member 16 abuts the innermost end of the lower flange portion 11c of the side rail 11, while the flange portion 16b of the lower cross member 16 extends across the lower surface of the lower flange portion 11c of the side rail 11. Thus, it can be seen that the side rail 11 and the cross member 13 are not positively positioned relative to one another, inasmuch as they may be pulled apart from one another (the side rail 11 being moved to the left and the cross member 13 being moved to the right from the position illustrated in FIG. 2).

Figure 3:
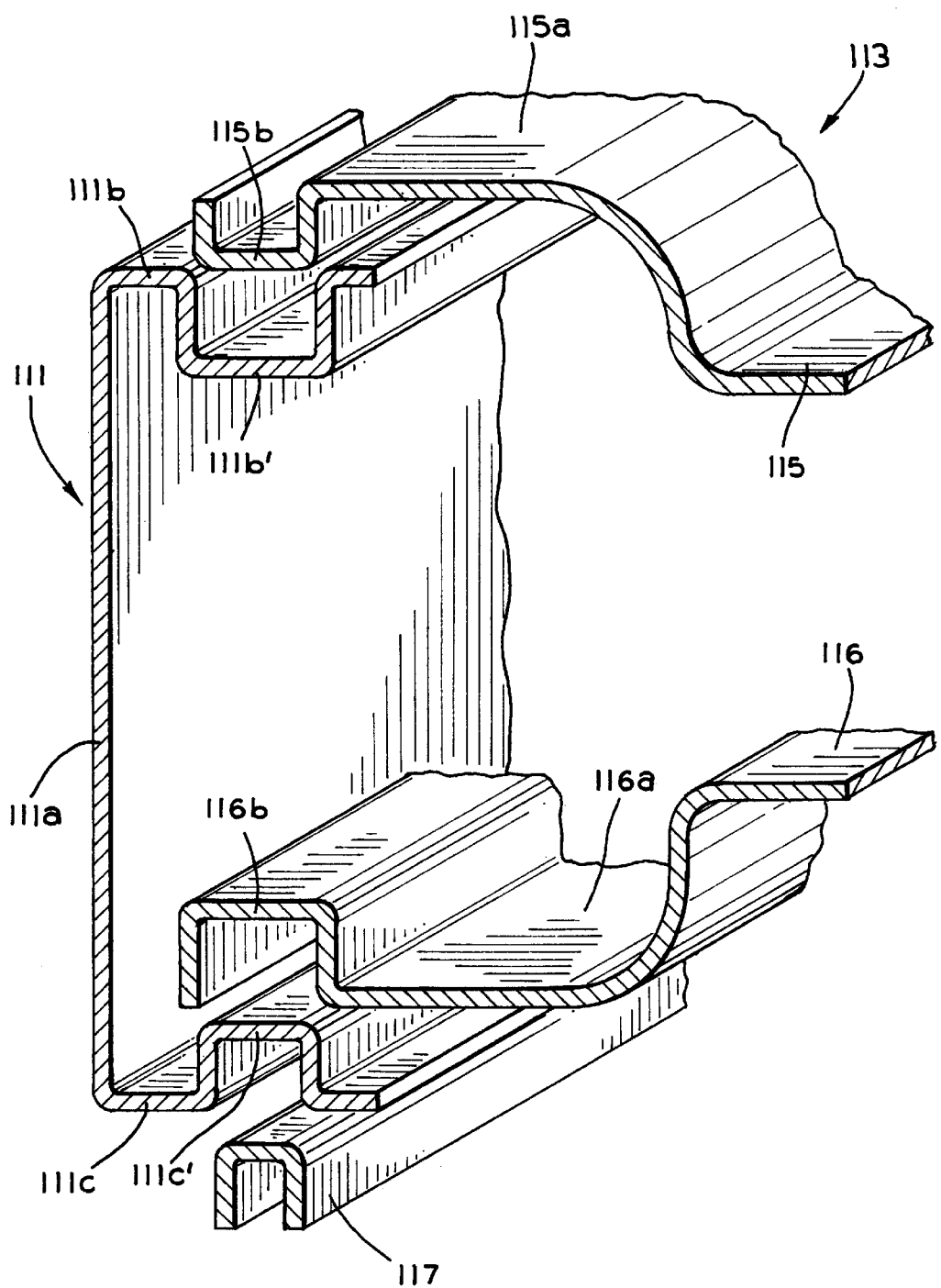
FIG. 3 is an enlarged sectional perspective view similar to FIG. 2 illustrating a first embodiment of a joint between one of the side rails and the end of one of the cross members illustrated in FIG. 1.

Referring now to FIG. 3, there is illustrated a first embodiment of an improved structure for a joint between a side rail, indicated generally at 111, and an end portion of one of the cross members, indicated generally at 113. As shown therein, the side rail 111 is generally C-shaped in cross section, including a generally vertically extending web portion 111a having upper and lower flange portions 111b and 111c extending generally horizontally inwardly therefrom. The upper flange portion 11b is formed having a longitudinally extending, generally U-shaped recess 111b', while the lower flange portion 111c is formed having a longitudinally, extending generally inverted U-shaped recess 111c'. The side rail 111 can be formed in this manner using conventional roll forming techniques. The cross member 113 includes an upper cross member 115 having an end portion composed of a generally horizontally extending flange portion 115a that terminates in a longitudinally extending, generally U-shaped protrusion 115b. The flange portion 115a of the upper cross member 115 extends across the upper surface of the upper flange portion 111b of the side rail 111, while the U-shaped protrusion 115b is received in the U-shaped recess 111b'. The cross member 113 further includes a lower cross member 116 having an end portion composed of a generally horizontally extending flange portion 116a that terminates in a longitudinally extending, generally inverted U-shaped protrusion 116b. The flange portion 116a of the lower cross member 116 extends across the upper surface of the lower flange portion 111c of the side rail 111, while the inverted U-shaped protrusion 116b is received in the U-shaped recess 111c'. The upper and lower cross members 115 and 116 can also be formed in this manner using conventional roll forming techniques. Thus, it can be seen that the side rail 111 and the cross member 113 are positively positioned relative to one another, inasmuch as they cannot be pulled apart from one another.

If desired, a reinforcement member 117 may be provided at the joint between either or both of the upper and lower cross members 115 and 116 with the side rail 111. The reinforcement member 117 is generally U-shaped in cross section and is sized to be received within the U-shaped recesses 115b and 116b of the upper and lower cross members 115 and 116, respectively. When so disposed, the reinforcement member 117 provides an additional measure of strength to the joint.

Figure 4:
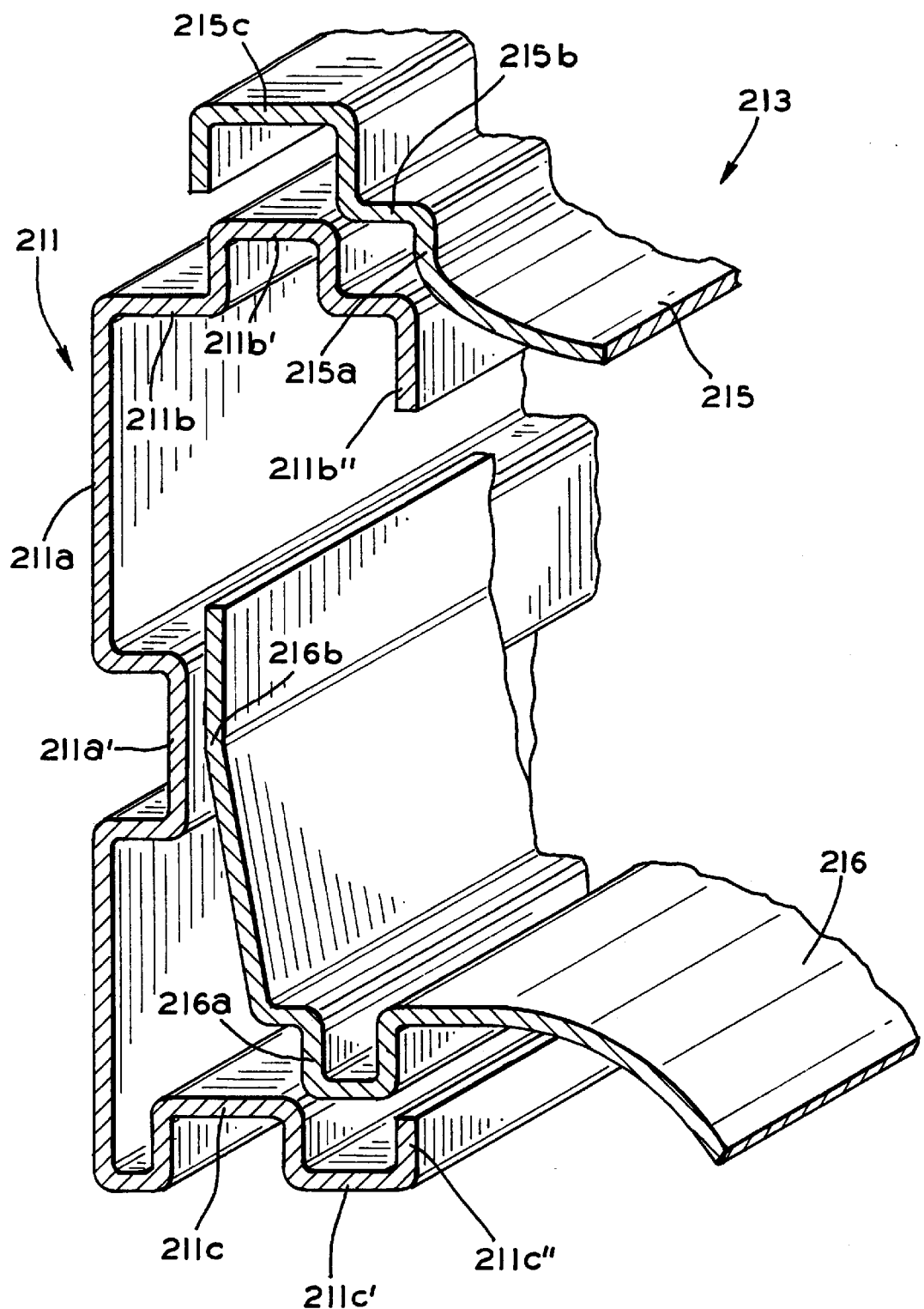
FIG. 4 is an enlarged sectional perspective view similar to FIG. 2 illustrating a second embodiment of a joint between one of the side rails and the end of one of the cross members illustrated in FIG. 1.

Referring now to FIG. 4, there is illustrated a second embodiment of an improved structure for a joint between a side rail, indicated generally at 211, and an end portion of one of the cross members, indicated generally at 213. As shown therein, the side rail 211 is generally C-shaped in cross section, including a generally vertically extending web portion 211a having upper and lower flange portions 211b and 211c extending generally horizontally inwardly therefrom. The web portion 211a has a longitudinally extending rib 211a' formed therein to increase the stiffness thereof The upper flange portion 211b is formed having a longitudinally extending, generally inverted U-shaped protrusion 211b' and terminates in a downwardly extending end flange 211b''. Similarly, the lower flange portion 211c is formed having a longitudinally extending, generally U-shaped protrusion 211c' and terminates in an upwardly extending end flange 211c''. The side rail 211 can be formed in this manner using conventional roll forming techniques. The cross member 213 includes an upper cross member 215 having an end portion composed of a generally vertically extending web portion 215a and a generally horizontally extending flange portion 215b that terminates in a longitudinally extending, generally inverted U-shaped recess 215c. When assembled, the web portion 215a of the upper cross member 215 abuts the end flange 211b'' of the side rail 211, the flange portion 215b of the upper cross member 215 extends across the upper surface of the upper flange portion 211b of the side rail 211, and the inverted U-shaped protrusion 211 b' of the side rail 211 is received in the inverted U-shaped recess 215 c of the cross member 215. The cross member 213 further includes a lower cross member 216 having an end portion composed of a longitudinally extending, generally U-shaped protrusion 216a and a longitudinally extending, generally vertically extending web portion 216b. The generally U-shaped protrusion 216a of the lower cross member 216 is received within the generally U-shaped recess 211c' of the side rail 211, and the web portion 216a of the lower cross member abuts the inner surface of the rib 211a' of the side rail 211. The upper and lower cross members 215 and 216 can also be formed in this manner using conventional roll forming techniques. Thus, it can be seen that the side rail 211 and the cross member 213 are positively positioned relative to one another, inasmuch as they cannot be pulled apart from one another.

Figure 5:
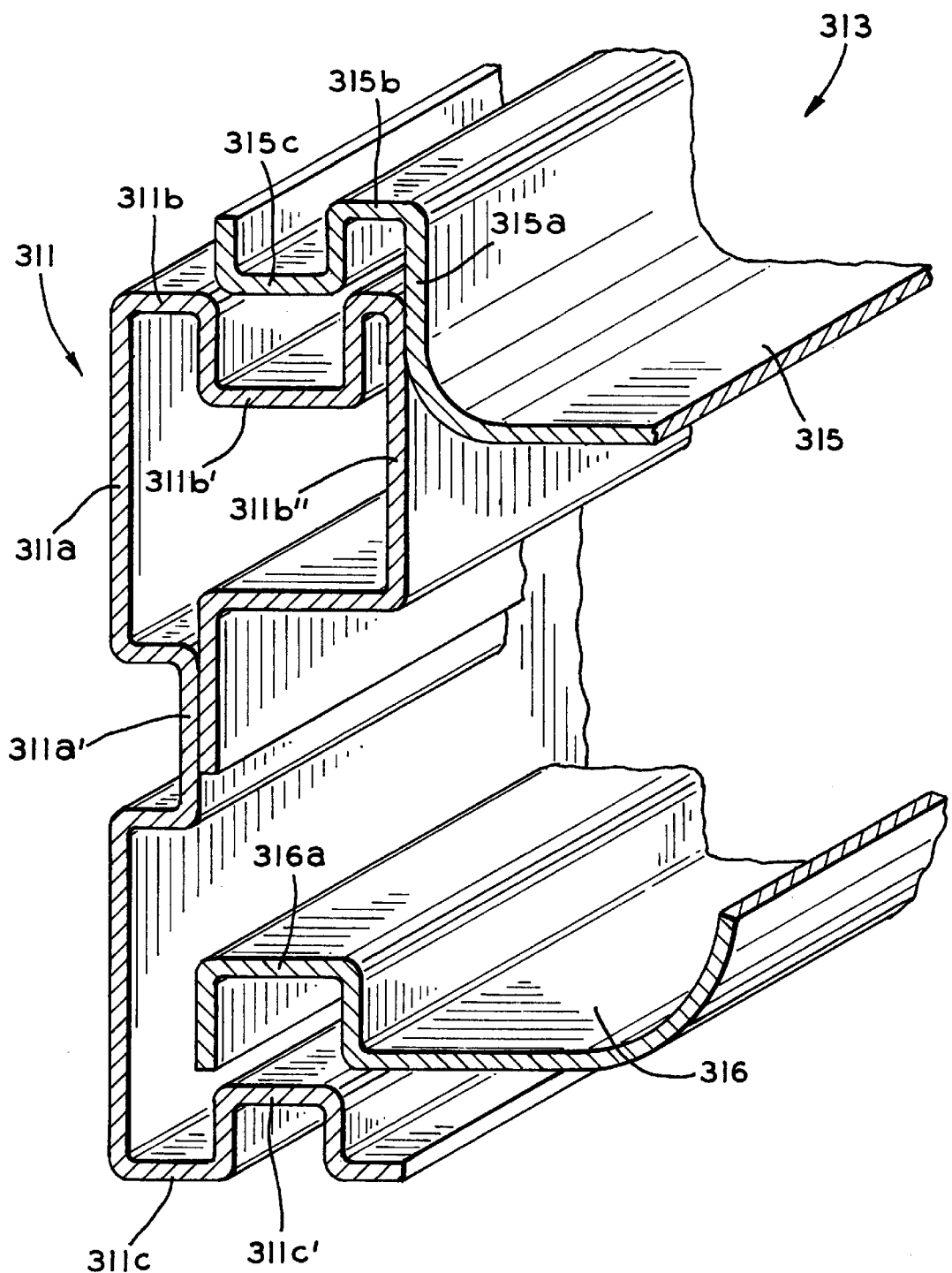
FIG. 5 is an enlarged sectional perspective view similar to FIG. 2 illustrating a third embodiment of a joint between one of the side rails and the end of one of the cross members illustrated in FIG. 1.

Referring now to FIG. 5, there is illustrated a third embodiment of an improved structure for a joint between a side rail, indicated generally at 311, and an end portion of one of the cross members, indicated generally at 313. As shown therein, the side rail 311 is generally C-shaped in cross section, including a generally vertically extending web portion 311a having upper and lower flange portions 311b and 311c extending generally horizontally inwardly therefrom. The web portion 311a has a longitudinally extending rib 311a' formed therein to increase the stiffness thereof. The upper flange portion 311b is formed having a longitudinally extending, generally U-shaped recess 311b' and terminates in a longitudinally extending end flange 311b" that is folded back to abut the rib 311a'. Similarly, the lower flange portion 311c is formed having a longitudinally extending, generally U-shaped protrusion 311c'. The side rail 311 can be formed in this manner using conventional roll forming techniques. The cross member 313 includes an upper cross member 315 having an end portion composed of a generally vertically extending web portion 315a and a generally horizontally extending flange portion 315b that terminates in a longitudinally extending, generally U-shaped protrusion 315c. When assembled, the web portion 315a of the upper cross member 315 abuts the end flange 311b" of the side rail 311, the flange portion 315b of the upper cross member 315 extends across the upper surface of the upper flange portion 311b of the side rail 311, and the U-shaped protrusion 315c of the cross member 315 is received in the U-shaped recess 311b' of the side rail 311. The cross member 313 further includes a lower cross member 316 having an end portion composed of a longitudinally extending, generally inverted U-shaped recess 316a. The generally U-shaped protrusion 311c' of the side rail 311 is received within the generally inverted U-shaped recess 316a of the lower cross member 316. The upper and lower cross members 315 and 316 can also be formed in this manner using conventional roll forming techniques. Thus, it can be seen that the side rail 311 and the cross member 313 are positively positioned relative to one another, inasmuch as they cannot be pulled apart from one another.

It should be noted that although this invention has been described using a variety of terms that recite directional or relative relationships, such as upper, lower, inward, outward, and the like. The use of such terms is made solely to facilitate the understanding of this invention and are not intended to be limiting the specific directional or relative relationships. Furthermore, this invention has been described as including recesses and protrusions that, again, are intended solely to facilitate the understanding of this invention and should not be construed as being limiting to the specific structures illustrated. For example, all of the above-described recesses and protrusions may be reversed if desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicular body and frame assembly comprising:

first and second longitudinally extending side rails, said first side rail having a longitudinally extending recess formed therein;

a plurality of cross members extending generally transversely between said first and second side rails, at least one of said cross members including an end portion having a longitudinally extending protrusion formed therein that is received within said longitudinally extending recess formed in said first side rail.

2. The vehicular body and frame assembly defined in claim 1 wherein said first side rail includes a web portion having first and second flange portions extending therefrom, and wherein said longitudinally extending recess is formed in said first flange portion.

3. The vehicular body and frame assembly defined in claim 1 wherein said first side rail includes a web portion having first and second flange portions extending therefrom, and wherein said longitudinally extending recess is a first longitudinally extending recess formed in said first flange portion, said vehicular body and frame assembly further including a second longitudinally extending recess formed in said second flange portion of said first side rail and a second cross member extending generally transversely between said first and second side rails, said second cross member including an end portion having a longitudinally extending protrusion formed therein that is received within said second longitudinally extending recess formed in said second flange portion of said first side rail.

4. The vehicular body and frame assembly defined in claim 1 further including a reinforcement member disposed within said longitudinally extending recess formed in said first side rail.

5. The vehicular body and frame assembly defined in claim 4 where said reinforcement member is generally U-shaped in cross section.

6. The vehicular body and frame assembly defined in claim 1 wherein said first side rail includes a web portion having first and second flange portions extending therefrom, and wherein a stiffening rib is formed in said web portion.

7. The vehicular body and frame assembly defined in claim 1 wherein said first side rail includes a web portion having first and second flange portions extending therefrom, said first flange portion having a longitudinally extending recess formed therein and terminating in an end flange.

8. The vehicular body and frame assembly defined in claim 7 wherein said cross member further includes a web portion that abuts said end flange of said first flange portion.

9. The vehicular body and frame assembly defined in claim 7 wherein said end flange abuts a portion of said first side rail.

10. The vehicular body and frame assembly defined in claim 7 wherein said first side rail includes a web portion having first and second flange portions extending therefrom, and wherein a stiffening rib is formed in said web portion, and wherein said end flange abuts a portion of said stiffening rib of said first side rail.

* * * * *